(12) United States Patent
Lamberts et al.

(10) Patent No.: US 11,531,582 B2
(45) Date of Patent: Dec. 20, 2022

(54) DATA STORAGE DEVICE DYNAMICALLY RELOCATING DATA SECTORS BASED ON MAP-OUT VALUE

(71) Applicant: Western Digital Technologies, Inc., San Jose, CA (US)

(72) Inventors: Bernd Lamberts, San Jose, CA (US); Remmelt Pit, Menlo Park, CA (US); Abhishek Srivastava, San Jose, CA (US); Karthik Venkatesh, Thornton, CO (US); Ammar A. Zayed, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 309 days.

(21) Appl. No.: 16/935,763

(22) Filed: Jul. 22, 2020

(65) Prior Publication Data
US 2022/0027226 A1 Jan. 27, 2022

(51) Int. Cl.
| | | |
|---|---|---|
| *G11B 20/18* | (2006.01) | |
| *G11B 20/10* | (2006.01) | |
| *G06F 11/07* | (2006.01) | |
| *G11B 20/12* | (2006.01) | |
| *G06F 3/06* | (2006.01) | |
| *G06F 11/10* | (2006.01) | |
| *G11B 5/008* | (2006.01) | |
| *G11B 5/012* | (2006.01) | |

(52) U.S. Cl.
CPC ........ *G06F 11/0793* (2013.01); *G06F 3/0619* (2013.01); *G06F 3/0631* (2013.01); *G06F 3/0676* (2013.01); *G06F 3/0679* (2013.01); *G06F 11/0727* (2013.01); *G06F 11/0751* (2013.01); *G06F 11/1068* (2013.01); *G11B 20/12* (2013.01); *G11B 20/1833* (2013.01); *G11B 20/1886* (2013.01); *G11B 20/1889* (2013.01); *G11B 5/00813* (2013.01); *G11B 5/012* (2013.01); *G11B 2020/1893* (2013.01); *G11B 2020/1896* (2013.01)

(58) Field of Classification Search
CPC .. G11B 2020/1873; G11B 20/18; G11B 20/10
USPC ................... 360/48; 369/53.12, 53.15, 53.17
See application file for complete search history.

(56) References Cited

U.S. PATENT DOCUMENTS

| | | |
|---|---|---|
| 6,034,831 A | 3/2000 | Dobbek et al. |
| 7,487,388 B2 | 2/2009 | Kim et al. |
| 8,953,398 B2 | 2/2015 | Lee et al. |

(Continued)

*Primary Examiner* — Nabil Z Hindi
(74) *Attorney, Agent, or Firm* — Patterson & Sheridan, LLP; Steven H. VerSteeg

(57) ABSTRACT

A data storage device is disclosed comprising a non-volatile storage medium (NVSM) having a plurality of data sectors and a plurality of reserve sectors. A map-out value is generated for each of a first plurality of the data sectors based on a read latency of each of the first plurality of data sectors, and when the map-out value of a first data sector in the first plurality of data sectors exceeds a threshold, a first logical block address (LBA) is mapped from the first data sector to a first reserve sector. When the map-out value of a second data sector in the first plurality of data sectors exceeds the map-out value of the first data sector, the first LBA is mapped from the first reserve sector back to the first data sector, and a second LBA is mapped from the second data sector to the first reserve sector.

20 Claims, 7 Drawing Sheets

(56) References Cited

U.S. PATENT DOCUMENTS

| | | |
|---|---|---|
| 10,606,699 B2 | 3/2020 | Oboukhov et al. |
| 2001/0042223 A1* | 11/2001 | Hoskins ............. G11B 20/1883 |
| 2005/0149827 A1* | 7/2005 | Lambert .......... G11B 20/10527 |
| 2006/0218211 A1* | 9/2006 | Shikama ............ G11B 20/1883 |
| 2010/0313076 A1 | 12/2010 | Wei et al. |
| 2015/0149709 A1 | 5/2015 | Du et al. |

* cited by examiner

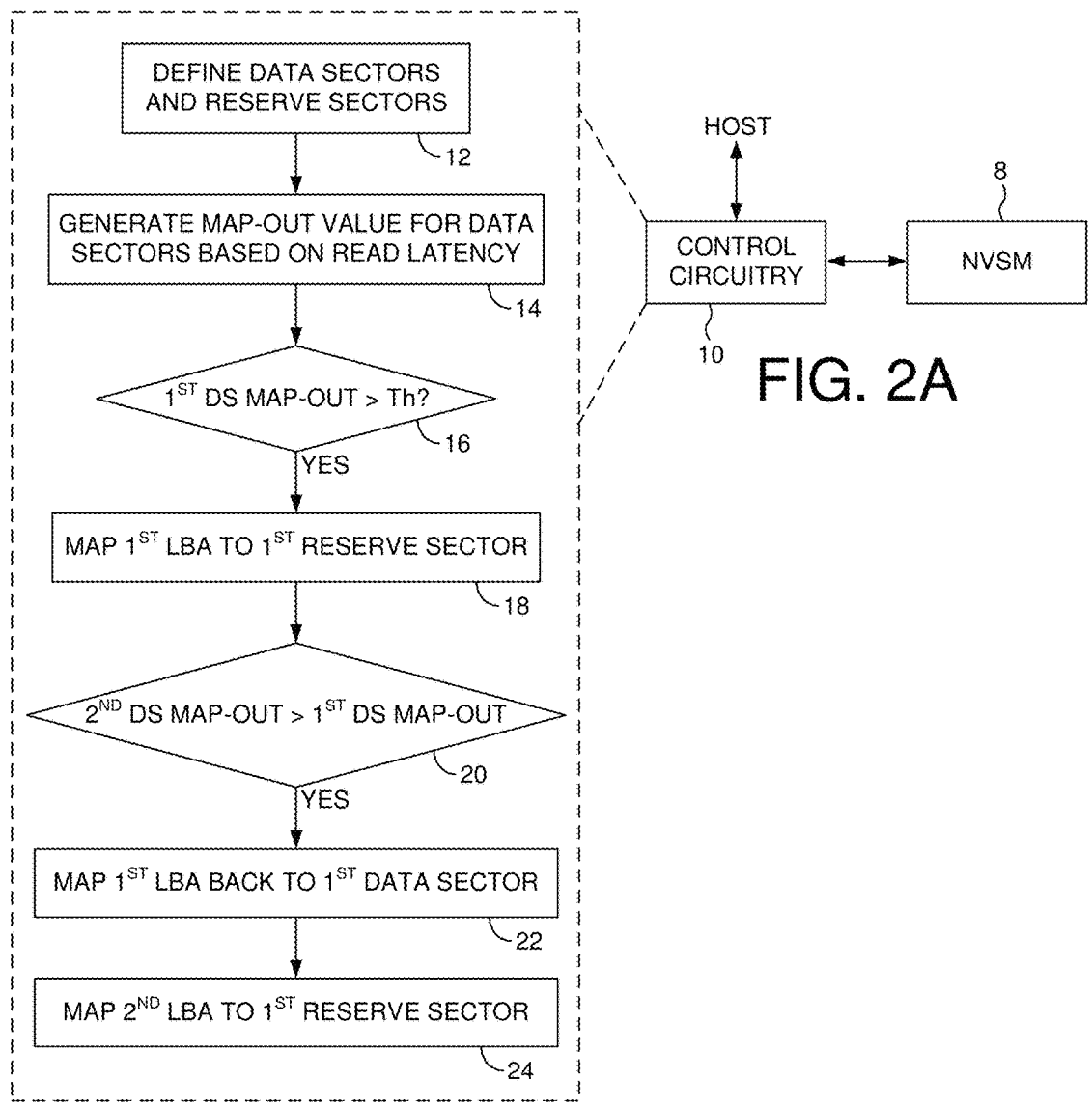
FIG. 2A
FIG. 2B
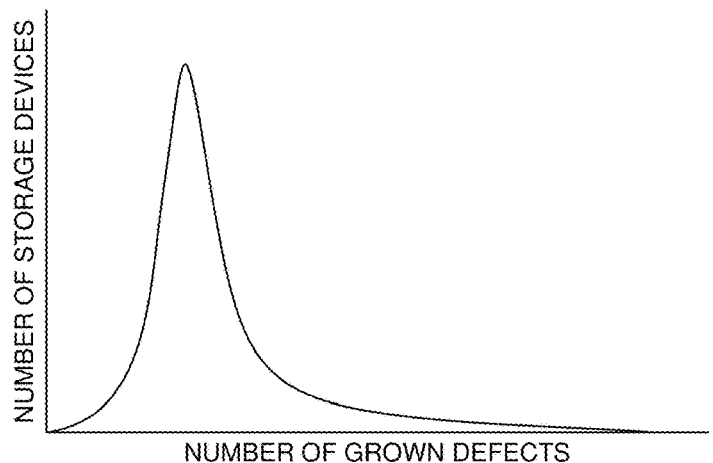
FIG. 2C

| DS | DS | DS | DS | DS | DS | DS | DS | DS |
|----|----|----|----|----|----|----|----|----|
| DS | DS | DS | DS | DS | DS | DS | DS | DS |
| DS | DS | DS | DS | DS | DS | DS | DS | DS |
| DS | DS | DS | DS | DS | DS | DS | DS | DS |
| DS | DS | DS | DS | DS | DS | DS | DS | DS |

FIG. 4A

| DS | DS | DS | DS | DS | DS | DS | DS | DS |
|----|----|----|----|----|----|----|----|----|
| DS | DS | DS | DS | DS | DS | DS | DS | DS |
| DS | DS | DS | DS | DS | DS | DS | DS | DS |
| DS | DS | DS | DS | DS | DS | DS | DS | DS |
| DS | DS | DS | DS | DS | DS | DS | DS | DS |

FIG. 4B

| DS | DS | DS | DS | DS | DS | DS | DS | DS |
|----|----|----|----|----|----|----|----|----|
| DS | DS | DS | DS | DS | DS | DS | DS | DS |
| DS | DS | DS | DS | DS | DS | DS | DS | DS |
| DS | DS | DS | DS | DS | DS | DS | DS | DS |
| DS | DS | DS | DS | DS | DS | DS | DS | DS |

DATA STORAGE DEVICE DYNAMICALLY RELOCATING DATA SECTORS BASED ON MAP-OUT VALUE

BACKGROUND

Data storage devices such as disk drives, tape drives, and solid state drives typically employ some form of error correction code (ECC) capable of correcting errors when reading the recorded data from the storage medium, thereby compensating for signal noise that is inherent with every recording/reproduction channel. During a write operation, redundancy symbols are generated and appended to user data which are then processed during a corresponding read operation in order to detect and correct errors in the user data.

FIG. 1A shows a prior art disk format 2 as comprising a number of servo tracks 4 defined by servo sectors $6_0$-$6_N$ recorded around the circumference of each servo track. Data tracks are defined relative to the servo tracks at the same or different radial density, wherein each data track comprises a plurality of data sectors. Each data sector may store the symbols of a single codeword, or in other embodiments, each data sector may store symbols from multiple codewords (i.e., interleaved codewords). FIG. 1B shows a prior art die format for a solid state drive, wherein each die may store multiple pages and each page may store multiple blocks each corresponding to a data sector of a disk drive.

BRIEF DESCRIPTION OF THE DRAWINGS

FIG. 2A shows a data storage device according to an embodiment comprising control circuitry and a non-volatile storage medium (NVSM).

FIG. 2B is a flow diagram according to an embodiment wherein a map-out value is generated for a plurality of data sectors based on a read latency of each data sector.

FIG. 2C shows an embodiment wherein the distribution of grown defects across a plurality of data storage devices is skewed closer toward the origin of the distribution, leaving many spare sectors unused over the life a typical data storage device.

FIG. 3A shows an embodiment wherein the NVSM is defined to include a number of reserve sectors and a number of data sectors.

FIG. 3B shows an embodiment wherein when the map-out value of a first data sector exceeds a threshold, the first data sector is relocated to a first reserve sector.

FIG. 3C shows an embodiment wherein when the map-out value of a second data sector exceeds the map-out value of the first data sector, the first data sector is reclaimed and the second data sector is relocated to the first reserve sector.

FIG. 4A shows an embodiment wherein data sectors are relocated to reserve sectors due to grown defects.

FIG. 4B shows an embodiment wherein additional data sectors are relocated to reserve sectors to remove "holes" between defective data sectors.

FIG. 4C shows an embodiment wherein additional data sectors are relocated to define a margin around defective data sectors.

FIG. 7A shows an embodiment wherein the reserve sectors of the NVSM may be used as hard spares and soft spares, as well as used to improve the performance of the data storage device (e.g., used as part of a write cache).

FIG. 7B shows an embodiment wherein more of the reserve sectors of the NVSM are used as hard spares, leaving less reserve sectors for performance improvement.

FIG. 7C shows an embodiment wherein most of the reserve sectors of the NVSM are used as hard spares, and the remaining reserve sectors are used for soft spares.

DETAILED DESCRIPTION

Figure 1A:
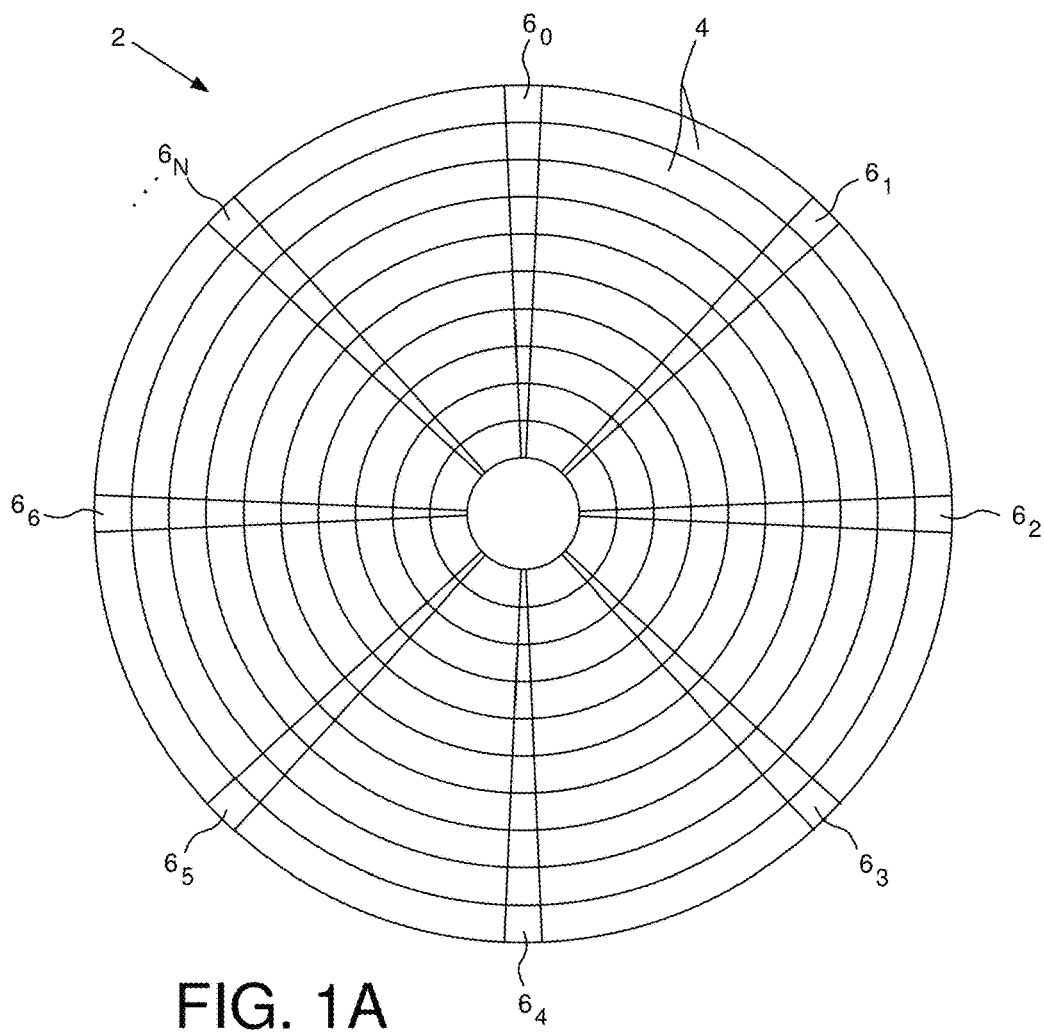
FIG. 1A shows a prior art disk format comprising a plurality of servo tracks defined by servo sectors.
Figure 1B:
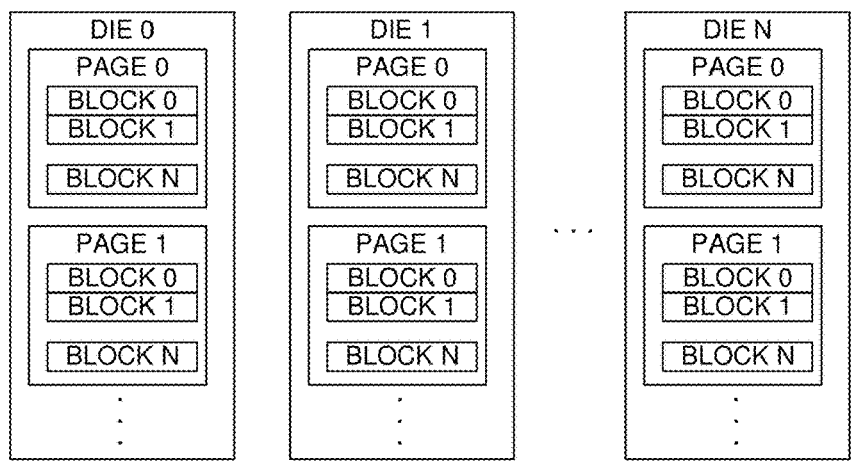
FIG. 1B shows a prior art solid state drive format comprising a plurality of dies each comprising a plurality of pages.

FIG. 2A shows a data storage device according to an embodiment comprising a non-volatile storage medium (NVSM) 8, and control circuitry 10 configured to execute the flow diagram of FIG. 2B. The data storage device may include one or more types of NVSM, including rotating magnetic media (e.g., a hard disk drive), magnetic tape media (e.g., tape drive), and solid state memory (e.g., a solid state drive). While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory, TLC, QLC, etc., or any combination thereof), NOR memory, EEPROM, Ferroelectric Memory (FeRAM), Magneto-resistive RAM (MRAM), other discrete NVM chips, or any combination thereof.

Referring to the flow diagram of FIG. 2B, in one embodiment the control circuitry defines a plurality of data sectors and a plurality of reserve sectors in the NVSM (block 12). A map-out value is generated for each of a first plurality of the data sectors based on a read latency of each of the first plurality of data sectors (block 14), and when the map-out value of a first data sector in the first plurality of data sectors exceeds a threshold (block 16), a first logical block address (LBA) is mapped from the first data sector to a first reserve sector (block 18). When the map-out value of a second data sector in the first plurality of data sectors exceeds the map-out value of the first data sector (block 20), the first LBA is mapped from the first reserve sector back to the first data sector (block 22), and a second LBA is mapped from the second data sector to the first reserve sector (block 24).

Figures 3A, 3B, 3C:
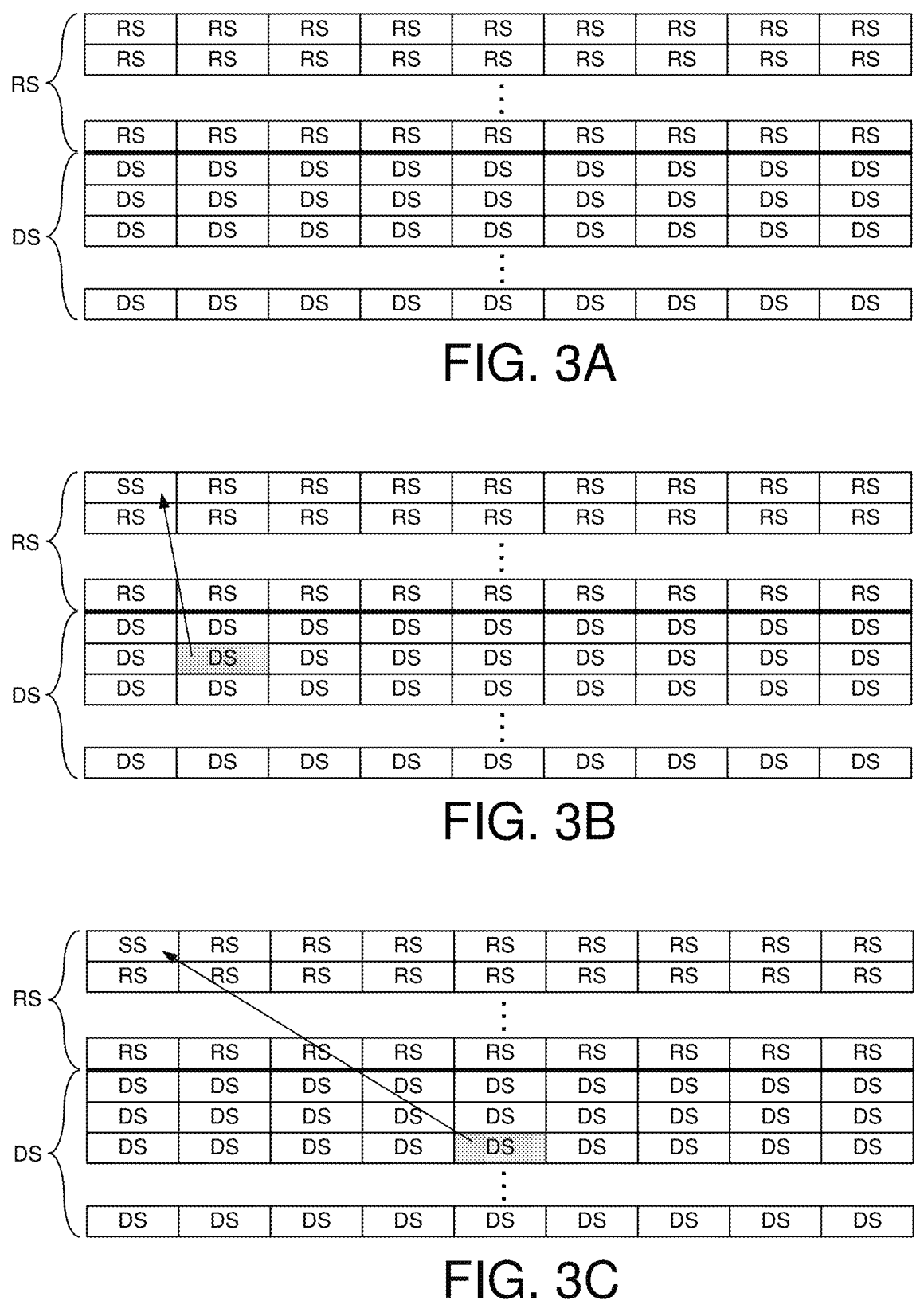

FIG. 3A shows an embodiment wherein the control circuitry 10 defines a plurality of reserve sectors (RS) and a plurality of data sectors (DS) in the NVSM 8. In one embodiment the NVSM may comprise multiple types of storage mediums, such as a solid state memory and a magnetic disk, wherein at least some of the reserve sectors may be located on the solid state memory and at least some of the data sectors may be located on the disk. In other embodiments, at least some of the data sectors and at least some of the reserve sectors may be located on the same type of storage medium, such as magnetic disk.

In one embodiment, the NVSM 8 may be subject to grown defects which are defects that can occur over the life of the data storage device. For example in a magnetic disk drive, a grown defect may be caused by the head contacting the disk surface leaving a scratch on the medium which can render affected data sectors unrecoverable. Similarly, for solid-state storage devices, grown defect may refer to memory locations that may become unreliable due to various factors including reaching write/erase cycle endurance limits. When a grown defect is detected, the control circuitry 10 relocates the defective data sectors to spare sectors by remapping the corresponding LBAs. In one embodiment, the number of grown defects that occur over the life of a data storage device may vary depending on, for example, manufacturing tolerances, external disturbances affecting the data storage device, environmental conditions, etc. Accordingly for a lot of data storage devices (e.g., sold to a particular customer), the number of grown defects that are detected while operating in the field may vary across the lot according to a corresponding distribution. Since the number of grown defects that may manifest for any particular data storage devices is unknown, a predetermined number of spare sectors are typically reserved within the NVSM in order to accommodate the worst case scenario across all of the data storage devices. However when the distribution of grown defects across the data storage devices is skewed toward a small number of grown defects such as shown in FIG. 2C, it means most of the data storage devices will overprovision the number of spare sectors within the NVSM that remain unused. Accordingly in one embodiment, the control circuitry 20 defines a number of reserve sectors such as shown in FIG. 3A which may be used as spare sectors to compensate for grown defects, but which can also be used to improve the performance of the data storage device. That is in one embodiment the resource value of the reserve sectors is exploited to improve the performance of all the data storage devices when first deployed. In one embodiment, most of the data storage devices such as shown in the distribution of FIG. 2C will retain this performance improvement over their useful life, whereas a few of the data storage devices farther out on the distribution curve (i.e., having more grown defects) will experience a decrease in performance due to more of the reserve sectors being used to relocate defective data sectors.

Referring again to FIG. 3A, in one embodiment each reserve sector may be used as a hard spare (HS), a soft spare (SS), or an auxiliary sector. In this embodiment, a hard spare is used to hard relocate a defective data sector that has become (or is near) unrecoverable due to a grown defect, a soft spare is used to soft relocate a marginal data sector that is still recoverable but degrades performance due to an excessive read latency, and an auxiliary sector is used in any suitable auxiliary capacity, such as to augment a write cache. Also in this embodiment, a hard relocate of a defective data sector means the relocation is effectively permanent, whereas a soft relocate of a marginal data sector means the relocation may be reversed as described below so as to dynamically optimize the use of the reserve sectors.

FIG. 3B shows an example embodiment wherein the control circuitry identifies and relocates a first data sector to one of the reserve sectors. For example, when the map-out value of the first data sector exceeds a threshold (block 16 of FIG. 2B), the LBA of the first data sector is mapped to one of the reserve sectors, thereby converting the reserve sector into a soft spare (SS) as shown in FIG. 3B. In one embodiment, the map-out value of a second data sector may exceed the map-out value of the first data sector (block 20 of FIG. 2B) and therefore the relocation of the first data sector may be reversed (block 22 of FIG. 2B) and the second data sector relocated to the corresponding reserve sector (block 24 of FIG. 2B) as shown in FIG. 3C. In this manner, the use of the reserve sectors may be optimized to relocate those marginal data sectors having the most significant impact on performance degradation in terms of the read latency associated with each data sector.

In one embodiment, the allocation of the reserve sectors between soft spares and auxiliary sectors may be dynamically adjusted in order to dynamically optimize the performance of the NVSM. For example, in one embodiment allocating more reserve sectors to soft spares may improve performance by decreasing the average read latency of the NVSM, whereas in another embodiment allocating more reserve sectors to a write cache may improve performance by increasing the write throughput of the NVSM. Referring again to the example embodiment of FIG. 3C, a newly identified marginal data sector may be relocated to a new soft spare if available, or it may replace a relocated data sector having a lower map-out value if all of the soft spares are in use.

In one embodiment, all of the reserve sectors may be initially allocated to any suitable purpose, such as to implement a write cache, relocate marginal data sectors to soft spares, etc. In another embodiment, a pace that the reserved sectors are allocated may be regulated (throttled) over the life of the data storage device so as to achieve any suitable performance criteria, such as to control the threshold and/or speed at which the performance degrades over time as the number of grown defects increases.

In one embodiment, the map-out value of all the data sectors may be initialized to the same value, and then updated during the normal operation of the data storage device. In one embodiment, the control circuitry 10 may periodically perform a defect scan of all the data sectors in order to detect defective data sectors (data sector at or near unrecoverable) or marginal data sectors having an increased read latency due to grown defects. In one embodiment, the map-out value for each data sector may be updated during the defect scan (where defective data sectors have the highest map-out value), and then the data sectors having the highest map-out value may be relocated to the reserve sectors. That is, the defective data sectors are relocated to hard spares, and the marginal data sectors having the highest map-out value are relocated to soft spares. In one embodiment, the number of marginal data sectors relocated to soft spares may be limited by the number of available soft spares, and in another embodiment, the number of marginal data sectors relocated to soft spares may be limited by a map-out threshold that corresponds to an acceptable level of performance improvement (i.e., a map-out value below the threshold may not provide sufficient performance improvement and so the marginal data sector is not relocated).

In one embodiment, the map-out value for each data sector may be updated during normal read operations of the data sectors. For example, in an embodiment described below the read latency of each data sector may be measured during each read operation, wherein the read latency of a data sector is based on the error correction code (ECC) processing time needed to recover the data sector. As the read latency of a data sector increases, the corresponding map-out value increases until it becomes beneficial to relocate the data sector to a soft spare, or until the map-out value exceeds the map-out value of a previously relocated data sector (i.e., when it is beneficial to swap the relocated data sectors).

FIG. 4A shows an example embodiment wherein four defective data sectors are detected due to a grown defect. In one embodiment, the data sectors are considered defective since they are unrecoverable or near unrecoverable as indicated by a high read latency. In one embodiment, a defective data sector is considered effectively permanent and so the defective data sector is relocated to a reserve sector that is allocated as a hard spare (i.e., a spare sector that is not dynamically re-assigned as with soft spares).

FIG. 4B shows an example embodiment wherein two groups of two contiguous data sectors are rendered defective by a grown defect, leaving a "hole" of two contiguous good data sectors. Accordingly in this embodiment, in order to effectively remove the "hole" the map-out value of the two good data sectors is increased to increase the likelihood the two good data sectors will be relocated to soft spares, thereby avoiding the read latency associated with reading all six contiguous data sectors. Consider, for example, that all of the data sectors in a row of FIG. 4B represent a data track on a magnetic disk. By relocating all six contiguous data sectors to spare sectors (hard spares and soft spares), the latency required to access the data sectors (e.g., the seek latency) may be reduced. For example, the six contiguous data sectors may be relocated to spare sectors on a reserve data track of the magnetic disk, or relocated to spare sectors of a solid state memory. In one embodiment, whether the good data sectors in the "holes" formed between defective data sectors are relocated depends on their map-out value, which may depend on the number of consecutive data sectors in each hole, the physical distance (e.g., number of data tracks) from the spare sectors, the read latency of each data sector, etc. Accordingly in one embodiment, the good data sectors of some holes may be relocated whereas the good data sectors of other holes may not be relocated, or the relocated good data sectors of a first hole may be later replaced with the good data sectors of a newly formed hole.

FIG. 4C shows a similar embodiment wherein the map-out value for a number of good data sectors that are proximate defective data sectors may be increased to increase the likelihood of mapping out these data sectors, thereby forming a "margin" around the defective data sectors. In one embodiment, forming a margin around defective data sectors improves performance of the data storage device by pre-emptively relocating data sectors that are likely to be adversely affected by a grown defect. For example, in one embodiment a grown defect may likely grow over time (e.g., across a disk surface), thereby eventually affecting additional, proximate data sectors.

In one embodiment, when the number of defective data sectors relocated to hard spares increases so as to squeeze out the number of available soft spares, or when the map-out value of a relocated good data sector such as in FIG. 4B or 4C falls below the map-out value of other data sectors, a good data sector may be "reclaimed" by reversing the LBA mapping from the soft spare back to the good data sector. Accordingly in this embodiment, there may be an increased latency in accessing the good data sector (e.g., seek latency or ECC latency), but the overall performance of the NVSM remains optimized by optimizing the use of the reserve sectors across the NVSM.

Figure 5:
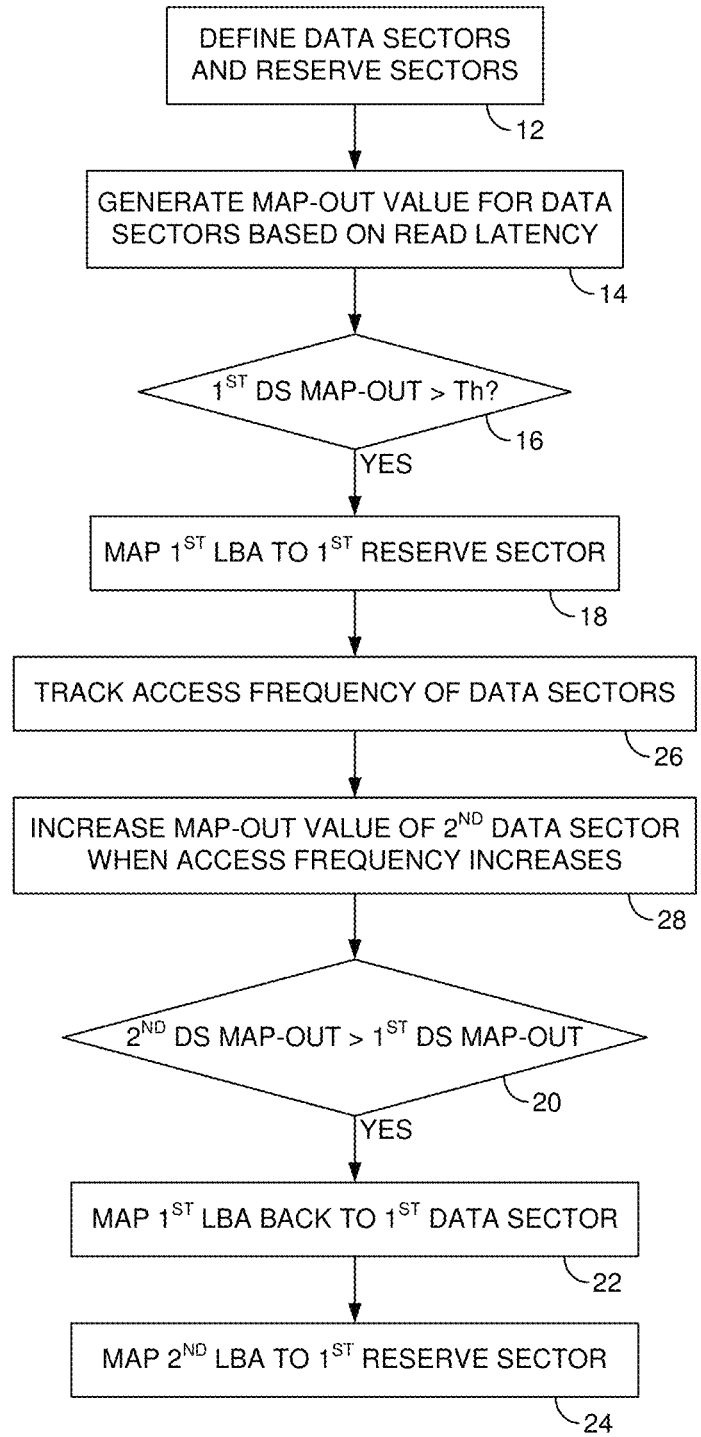
FIG. 5 is a flow diagram according to an embodiment wherein the map-out value of a data sector is weighted based on the access frequency of the data sector.

In some embodiments, the map-out value of each data sector may be weighted by any suitable consideration, such as the access frequency of each data sector. For example, in one embodiment the map-out value of a data sector may be increased as its access frequency increases since the performance improvement of relocating a data sector is effectively amplified by its access frequency. FIG. 5 is a flow diagram according to this embodiment which extends on the flow diagram of FIG. 2B, wherein during normal operation of the data storage device the control circuitry tracks the access frequency of each data sector (block 26). When the access frequency of a data sector increases, the map-out value of the data sector is increased (block 28), thereby increasing the likelihood that the data sector will be relocated to a soft spare.

Figure 6A:
FIG. 6A shows an embodiment wherein a data sector may comprise user data and error correction code (ECC) redundancy, wherein the read latency of the data sector is based on the ability of the ECC to recover the data sector.

FIG. 6A shows an embodiment wherein a codeword may be generated over a block of user data by generating error correction code (ECC) redundancy in any suitable manner. Although in the embodiment of FIG. 6A the ECC is shown as being appended to the user data (e.g., using a Reed-Solomon or similar block code), in other embodiments the ECC may be interleaved with the user data (e.g., using a low density parity check (LDPC) code or similar iterative code). In one embodiment, each codeword may be written to a data sector, and in other embodiments, a number of the codewords may be interleave written to a number of the data sectors in a technique referred to as distributed ECC. In one embodiment, the read latency of a data sector (and therefore its map-out value) is based on the ability of the ECC to recover a codeword stored by the data sector. For example, in one embodiment the map-out value of a data sector may be increased as the number of symbol errors in the codeword increases toward the limit of the ECC correction power (e.g., with a block ECC such as Reed-Solomon). In another embodiment, the map-out value of a data sector may be increased as the number iterations needed to recover a codeword increases (e.g., with an iterative ECC such as LDPC).

Figure 6B:
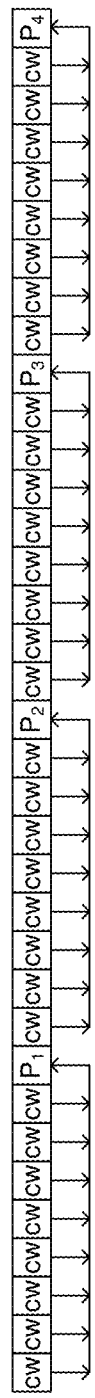
FIG. 6B shows an embodiment wherein a parity codeword may be generated over multiple sector level codewords.

FIG. 6B shows an embodiment wherein a parity codeword may be generated over a block of the codewords shown in FIG. 6A by generating a parity sector (e.g., $P_1$) over the codewords. In one embodiment the parity sector may be used as a hard parity sector used to reconstruct one or more unrecoverable codewords, and in another embodiment the parity sector may be used as a soft parity sector used to recover one or more unrecoverable codewords using an iterative decoder. In one embodiment, the map-out value of a data sector is generated (or updated) based on the number of unrecoverable codewords within the parity codeword. For example, if the parity codeword is able to recover two codewords that are unrecoverable using the sector level ECC, the map out value of an unrecoverable codeword may be increased when there are two unrecoverable codewords within a parity codeword (i.e., increase the likelihood of mapping out at least one of the codewords before exceeding the correction power of the parity codeword).

Figure 6C:
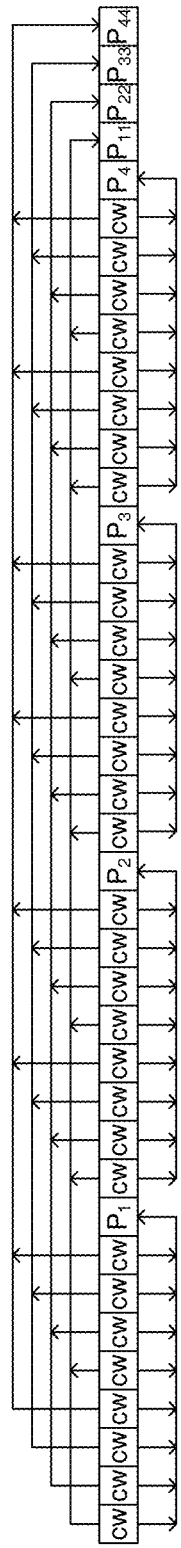
FIG. 6C shows an embodiment wherein an interleave parity codeword may be generated over an interleave of the sector level codewords.

FIG. 6C shows an embodiment wherein a block of codewords are further protected by generating interleave parity sectors (e.g., $P_{11}$) over a corresponding interleave of the codewords. In one embodiment, the codewords unrecoverable using the sector level ECC may be recovered by iteratively processing the codewords using the inline parity sectors and the interleave parity sectors. More details concerning the embodiment of FIG. 6C are disclosed in U.S. Pat. No. 10,606,699 entitled "DATA STORAGE DEVICE EMPLOYING MULTI-LEVEL PARITY SECTORS FOR DATA RECOVERY PROCEDURE," the disclosure of which is incorporated herein by reference. In one embodiment, the read latency of each data sector in FIG. 6C may be based on the number of iterations of the inline and interleave parity sectors needed to recover the data sectors. When the read latency increases such that the corresponding map-out value exceeds the threshold at block 16 of FIG. 2B, at least one of the data sectors unrecoverable using the sector level ECC is relocated to a soft spare in order to decrease the overall read latency of the block of codewords covered by the parity sectors. At some point a data sector relocated to a soft spare may be reclaimed by reversing the LBA mapping from the soft spare. In this embodiment, the data sector remains recoverable using the inline and interleave parity sectors, although the overall read latency of the data sectors (i.e., the parity sector iterations) may again increase.

Figures 7A, 7B, 7C:
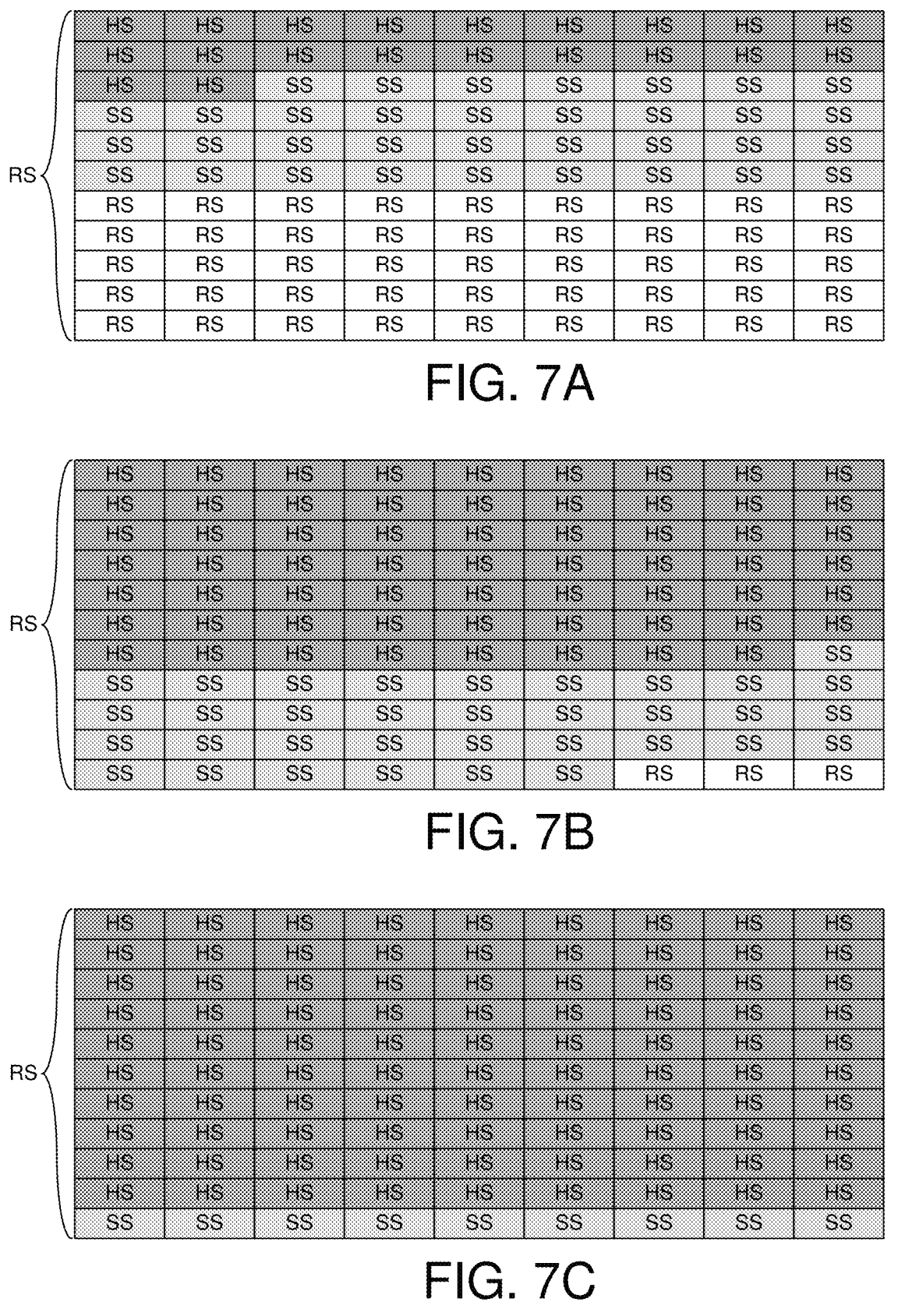

FIGS. 7A-7C each shows a current state of the block of reserve sectors, wherein in one embodiment the figures represent the progressive state of the reserve sectors over the life of a data storage device, and in another embodiment the figures represent the current state of a representative data storage device in the distribution of FIG. 2C. For example, in one embodiment FIG. 7A may represent the current state of the reserve sectors early in the life of a data storage device, wherein a first percentage of the reserve sectors are used as hard spares, a second percentage are used as soft spares, and a third percentage are used as auxiliary sectors (e.g., to augment a write cache). When the reserve sectors are in the state of FIG. 7A, the data storage device may be operating at optimal performance by exploiting the reserve sectors as an unused resource (e.g., as soft spares or auxiliary sectors). FIG. 7B may represent a progression over time of the data storage device wherein more of the reserve sectors are used as hard spares due to an increasing number of grown defects. FIG. 7C may represent the state of the reserve sectors when the data storage device nears end of life, wherein for this particular data storage device most of the reserve sectors are used as hard spares due to a large number of grown defects (i.e., a data storage device falling farthest out in the distribution of FIG. 2C).

FIGS. 7A-7C may also represent a state of the reserve sectors for three different data storage devices, for example, in a lot of data storage devices sold to a particular customer. In one embodiment when nearing end of life, the state of the reserve sectors for most of the data storage devices will look like FIG. 7A, some will look like FIG. 7B, and a few will look like FIG. 7C (e.g., as shown in the distribution of FIG. 2C). Accordingly in this embodiment, the performance of most of the data storage devices will meet or exceed the performance requirements of the customer due to exploiting the reserve sectors in an optimal manner as described above. In one embodiment, when the performance of a data storage device falls below the requirements of the customer (e.g., a data storage device corresponding to FIG. 7C), the data storage device may be swapped out so as to maintain an overall performance level for the customer.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the NVSM and read into a volatile semiconductor memory when the data storage device is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a non-volatile storage medium (NVSM); and
   control circuitry configured to:
   define a plurality of data sectors and a plurality of reserve sectors in the NVSM;
   generate a map-out value for each of a first plurality of the data sectors based on a read latency of each of the first plurality of data sectors;
   when the map-out value of a first data sector in the first plurality of data sectors exceeds a threshold, map a first logical block address (LBA) from the first data sector to a first reserve sector;
when the map-out value of a second data sector in the first plurality of data sectors exceeds the map-out value of the first data sector:
map the first LBA from the first reserve sector back to the first data sector; and
map a second LBA from the second data sector to the first reserve sector.

2. The data storage device as recited in claim 1, wherein the control circuitry is further configured to update the map-out value of at least the second data sector.

3. The data storage device as recited in claim 2, wherein the control circuitry is further configured to:
detect a grown defect in the NVSM; and
when the grown defect is detected, increase the map-out value of the second data sector.

4. The data storage device as recited in claim 3, wherein the control circuitry is further configured to increase the map-out value of the second data sector when the grown defect affects part of the NVSM that includes the second data sector.

5. The data storage device as recited in claim 3, wherein the control circuitry is further configured to increase the map-out value of the second data sector when the grown defect affects part of the NVSM that is proximate the second data sector.

6. The data storage device as recited in claim 2, wherein the control circuitry is further configured to increase the map-out value of the second data sector when an access frequency of the second data sector increases.

7. The data storage device as recited in claim 2, the control circuitry is further configured to increase the map-out value of the second data sector when a read latency of the second data sector increases.

8. The data storage device as recited in claim 7, wherein the read latency of the second data sector increases when a sector level error correction code (ECC) fails to recover the second data sector.

9. The data storage device as recited in claim 7, wherein:
the control circuitry is further configured to define a parity codeword over at least the second data sector and a third data sector; and
the read latency of the second data sector increases when the parity codeword is required to recover the second data sector.

10. The data storage device as recited in claim 7, wherein:
the control circuitry is further configured to define a parity codeword over at least the second data sector and a third data sector; and
the read latency of the second data sector increases when a parity sector processing time of the parity codeword increases.

11. A data storage device comprising:
a non-volatile storage medium (NVSM); and
control circuitry configured to:
define a plurality of data sectors and a plurality of reserve sectors in the NVSM;
first utilize a first reserve sector to improve performance of the data storage device;
detect a defect of a first data sector due to a first grown defect; and
second utilize the first reserve sector as a spare sector to relocate the first data sector, wherein the control circuitry is further configured to first utilize the first reserve sector as part of a write cache, wherein the control circuitry is further configured to first utilize a second reserve sector as a spare sector to relocate a second data sector proximate the first data sector, wherein the control circuitry is further configured to:
detect a defect of a third data sector due to a second grown defect; and
second utilize the second reserve sector as a spare sector to relocate the third data sector.

12. The data storage device as recited in claim 11, wherein the control circuitry is further configured to reclaim the second data sector by mapping a logical block address (LBA) from the second reserve sector to the second data sector.

13. A data storage device comprising:
a non-volatile storage medium (NVSM); and
control circuitry configured to:
define a plurality of data sectors and a plurality of reserve sectors in the NVSM;
first utilize a first reserve sector to improve performance of the data storage device;
detect a defect of a first data sector due to a first grown defect; and
second utilize the first reserve sector as a spare sector to relocate the first data sector, wherein the control circuitry is further configured to:
generate a map-out value for each of a first plurality of the data sectors; and
when the map-out value of a second data sector in the first plurality of data sectors exceeds a threshold, first utilize the first reserve sector to relocate the second data sector.

14. The data storage device as recited in claim 13, wherein the control circuitry is further configured to increase the map-out value of the second data sector when an access frequency of the second data sector increases.

15. The data storage device as recited in claim 13, the control circuitry is further configured to increase the map-out value of the second data sector when a read latency of the second data sector increases.

16. The data storage device as recited in claim 15, wherein the read latency of the second data sector increases when a sector level error correction code (ECC) fails to recover the second data sector.

17. A data storage device comprising:
a non-volatile storage medium (NVSM) means; and
control circuitry coupled to the NVSM means, wherein the control circuitry is configured to:
define a plurality of data sectors and a plurality of reserve sectors in the NVSM; and
optimize use of the reserve sectors, wherein optimizing comprises:
mapping a first logical block address (LBA) from a first data sector of the plurality of data sectors to a first reserve sector;
when a map-out value of a second data sector in the plurality of data sectors exceeds a map-out value of the first data sector:
map the first LBA from the first reserve sector back to the first data sector; and
map a second LBA from a second data sector to the first reserve sector.

18. The data storage device of claim 17, wherein the control circuitry is further configured to track access frequency of the plurality of data sectors.

19. The data storage device of claim 17, wherein the control circuitry is further configured to increase map-out values of the second data sector when access frequency increases.

20. The data storage device of claim 17, wherein the control circuitry is further configured to generate the map-out value for the plurality of data sectors based on read latency.

* * * * *